(12) United States Patent
Jerome et al.

(10) Patent No.: US 8,880,998 B2
(45) Date of Patent: Nov. 4, 2014

(54) WEB-BASED DEALERSHIP MANAGEMENT SYSTEM

(76) Inventors: Sandra L Jerome, Port St Lucie, FL (US); Keith Jerome, Port St Lucie, FL (US)

( * ) Notice: Subject to any disclaimer, the term of this patent is extended or adjusted under 35 U.S.C. 154(b) by 358 days.

(21) Appl. No.: 13/488,467

(22) Filed: Jun. 5, 2012

(65) Prior Publication Data
US 2012/0265648 A1 Oct. 18, 2012

Related U.S. Application Data

(62) Division of application No. 12/348,314, filed on Jan. 4, 2009, now Pat. No. 8,495,487.

(60) Provisional application No. 61/010,102, filed on Jan. 7, 2008.

(51) Int. Cl.
*G06F 17/30* (2006.01)
*G06Q 10/10* (2012.01)
*G06Q 40/00* (2012.01)

(52) U.S. Cl.
CPC ............... *G06Q 10/10* (2013.01); *G06Q 40/00* (2013.01)
USPC ........... 715/234; 715/226; 707/602; 707/603; 707/607; 707/705; 707/706

(58) Field of Classification Search
CPC ......... G06F 17/20; G06F 17/21; G06F 17/30; G06F 17/30002; G06F 17/3002; G06F 17/30023; G06F 17/3005; G06F 17/30286; G06F 17/30289; G06F 17/30634; G06F 17/30657; G06F 17/30861; G06Q 10/10; G06Q 10/08; G06Q 30/04; G06Q 30/06; G06Q 40/00
USPC .......... 715/226, 234; 707/602, 603, 607, 705, 707/706

See application file for complete search history.

(56) References Cited

U.S. PATENT DOCUMENTS

| | | | | |
|---|---|---|---|---|
| 5,638,501 A * | 6/1997 | Gough et al. | ................. | 345/639 |
| 5,657,233 A * | 8/1997 | Cherrington et al. | ......... | 705/400 |
| 5,706,494 A * | 1/1998 | Cochrane et al. | ..................... | 1/1 |
| 5,765,874 A * | 6/1998 | Chanenson et al. | ............ | 283/67 |
| 5,774,883 A * | 6/1998 | Andersen et al. | ................ | 705/38 |
| 5,778,178 A * | 7/1998 | Arunachalam | ............... | 709/203 |
| 5,987,500 A * | 11/1999 | Arunachalam | ............... | 709/203 |
| 6,029,182 A * | 2/2000 | Nehab et al. | .................. | 715/205 |
| 6,041,310 A * | 3/2000 | Green et al. | ................. | 705/26.41 |
| 6,128,611 A * | 10/2000 | Doan et al. | .................... | 707/779 |
| 6,141,759 A * | 10/2000 | Braddy | .......................... | 726/14 |
| 6,856,970 B1 * | 2/2005 | Campbell et al. | ............... | 705/35 |
| 6,867,789 B1 * | 3/2005 | Allen et al. | .................... | 715/744 |
| 2002/0111842 A1 * | 8/2002 | Miles | ............................... | 705/8 |
| 2003/0061102 A1 * | 3/2003 | Menninger et al. | ............. | 705/22 |
| 2004/0044688 A1 * | 3/2004 | Brudz et al. | ............... | 707/104.1 |
| 2005/0065956 A1 * | 3/2005 | Brown | .......................... | 707/102 |
| 2005/0235203 A1 * | 10/2005 | Undasan | ........................ | 715/526 |
| 2008/0243834 A1 * | 10/2008 | Rieman et al. | ..................... | 707/5 |

OTHER PUBLICATIONS

Person; Special Edition Using Microsoft Excel 97; Dec. 17, 1996; Que Publishing; pp. 70-79, 85-91, and 878-885; included as pp. 1-41.*

* cited by examiner

*Primary Examiner* — Andrew Dyer

(57) ABSTRACT

An integrated web-based dealership management system providing accounting, financial reporting, parts and service sales tracking, vehicle and parts inventory, vehicle sales tracking, and customer management software developed on a relational database on a web server and with web application tools.

1 Claim, 3 Drawing Sheets

Illustrates features and advantages of using a web-based dealership management system

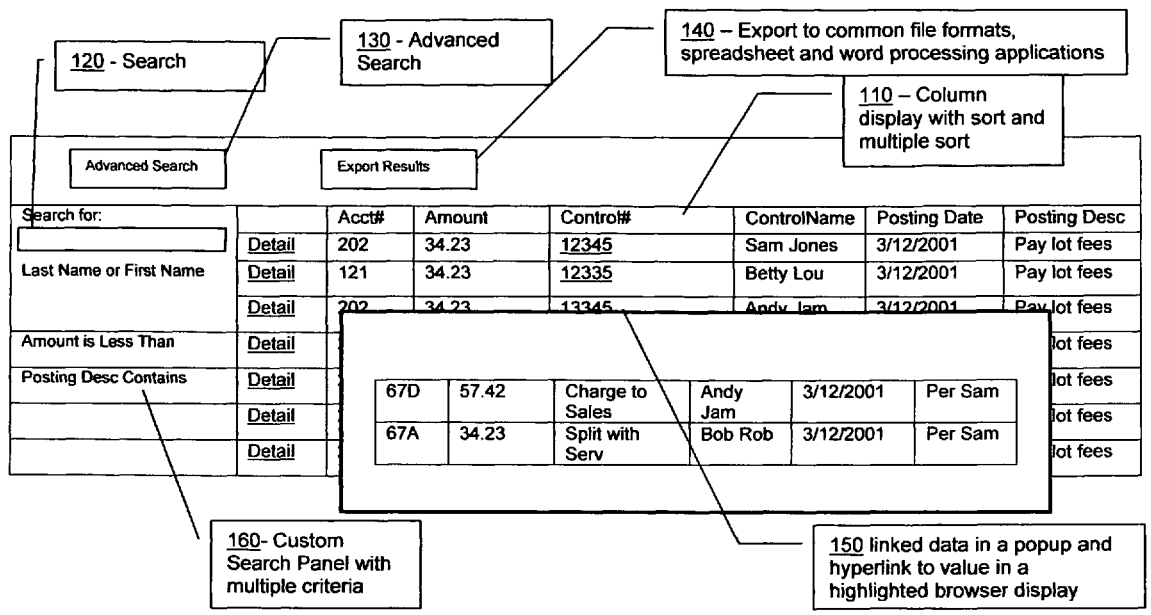
FIG. 1a - Illustrates features and advantages of using a web-based dealership management system
FIG. 1b - Illustrates a record add or update form with client and server side scripts

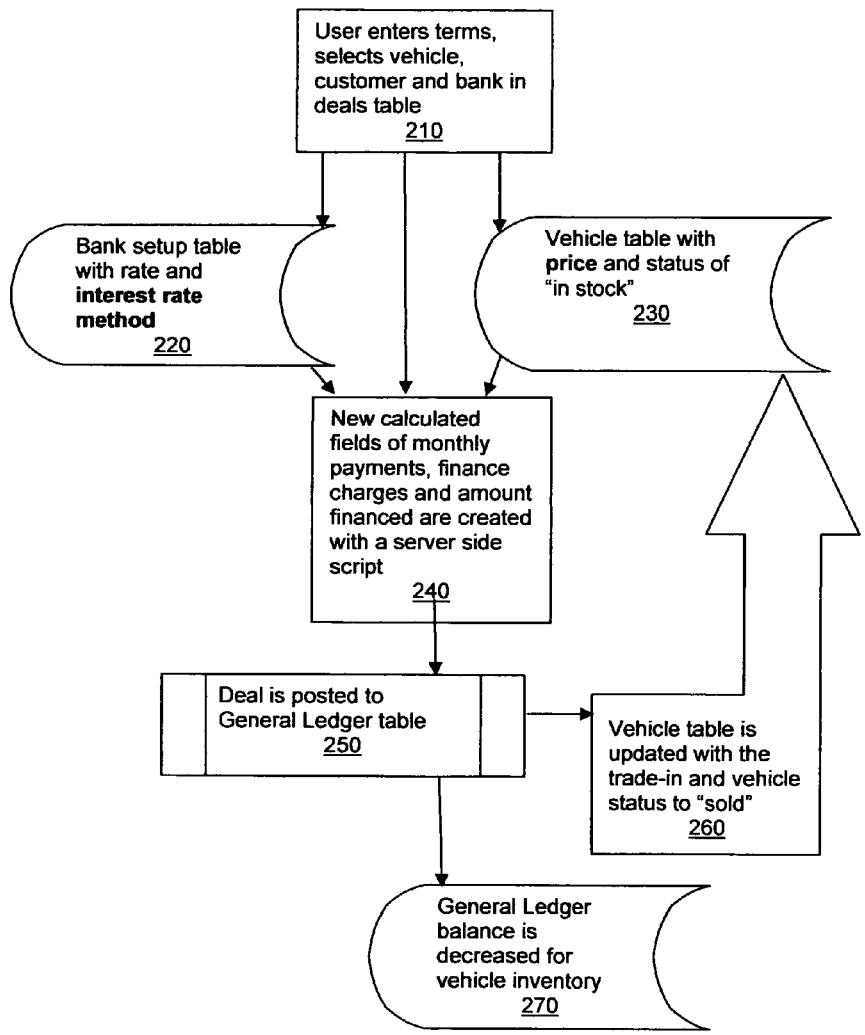
FIG. 2 shows a flowchart of using client and server side embedded scripts on a form to update the database

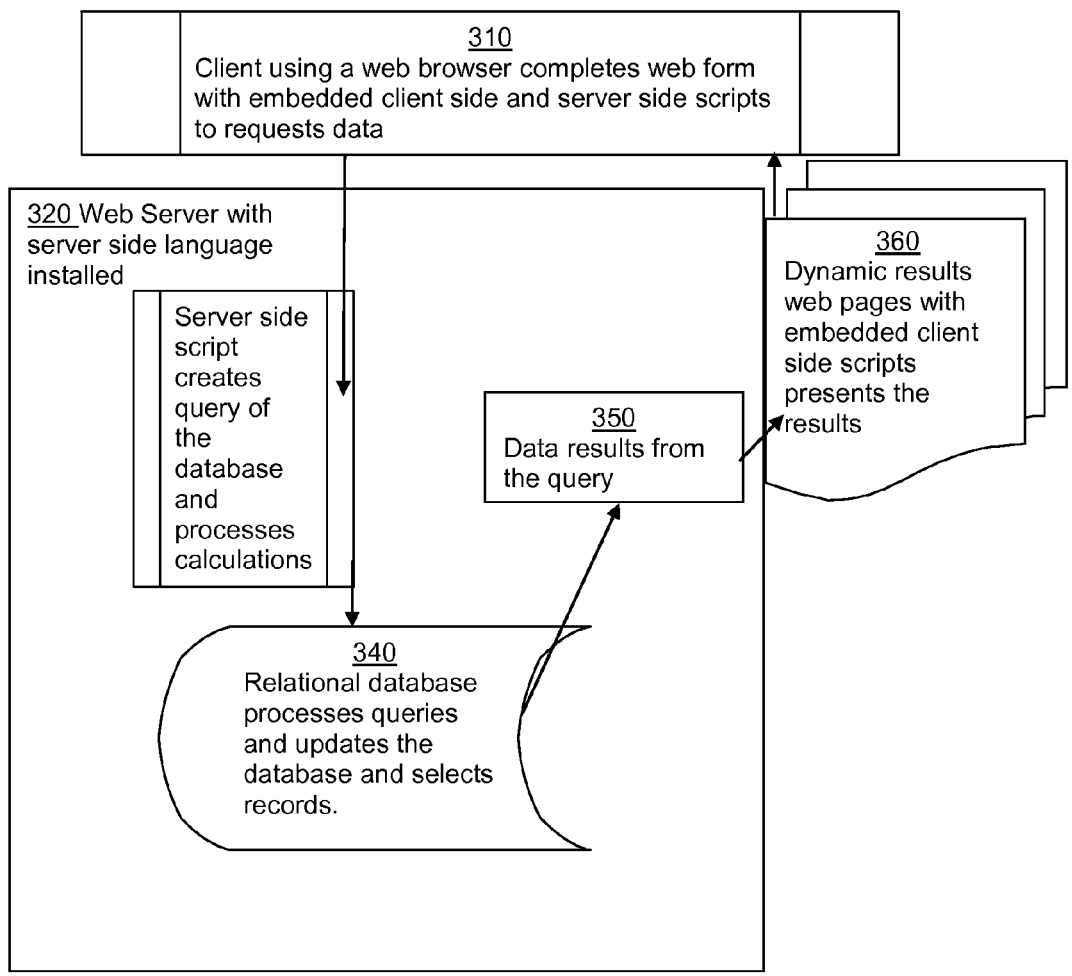
Figure 3 – Overview of the technical layer architecture of the invention

WEB-BASED DEALERSHIP MANAGEMENT SYSTEM

CROSS REFERENCE

This divisional application claims the benefit of application Ser. No. 12/348,314, filed Jan. 4, 2009 now U.S. Pat. No. 8,495,487 by Sandra Lee Jerome and Keith Jerome, Amendment to application Ser. No. 12/248,314 filed Mar. 19, 2012 and the Provisional patent filed on Jan. 7, 2008, application No. 61/010,102 by Sandra Lee Jerome and Keith Jerome granted Jan. 23, 2008, "Open dealership management system developed in mySQL, PHP, HTML, and Javascript."

FIELD

This invention relates generally to the field of dealership management software and more particularly, to a method of using a relational database on a web server and web application tools to provide integrated web-based accounting, financial reporting, parts and service sales tracking, vehicle and parts inventory, vehicle sales tracking, and customer management software for automotive, truck, RV, motorcycle, and boat retail dealerships.

BACKGROUND

Automotive, truck, RV, motorcycle and boat retailers have long been automated using a more traditional form of business software based on legacy databases and their fourth generation software generation tools. Although some dealership management systems use web browsers to display stored or aggregated data from other systems, it is a normally a read-only process for the browser. Some legacy systems are moving towards using web servers to hold, clean, and transmit data, but these applications still use their legacy database to process the data and then temporary tables to hold the data that the browser then displays.

This invention uses Web 2.0 technology and a browser to directly query the relational database. This browser is the application for this invention instead of just a user interface for a legacy application. It uses scripting technology to process the data requests and the speed of the client and server side scripts greatly improves the response time of the displays back the user. In addition this invention uses web application tools and relational databases.

The Internet has spawned many different sites using this open source software that enable consumers to search for vehicles and go through the process of communicating with the dealerships via a lead generation system. For example, www.cars.com is a successful site that enables users to research a vehicle, and then search for a vehicle. When the vehicle is found, then the user can make contact with a dealer by entering their user information and desired vehicle information. This data is sent via a lead generation system or emailed to the dealership.

Current dealership management systems have many shortcomings when it comes to integration with the lead generation system and online marketing websites. First, the dealership management software rarely has an import routine. Second, the database format is incompatible with the databases used in web-based sites like cars.com, making "live" integration almost impossible. Third, the development tools are very different, making it hard for the IT departments in dealerships to maintain the old legacy dealership management systems while at the same time keeping up-to-date with the latest Internet tools for consumer marketing sites. Fourth, there are more tools created every year to help dealerships market and manage their inventories for sale and interact with customers. Examples of these tools are RFID tags that enable the dealership to find the location of vehicle inventory and websites that allow consumers to make their own service appointments. These third party products are being developed in web-based tools that make integration with legacy dealership management systems difficult and often require double entry of data by the users.

With the current dealership management systems being limited in their ability to interface with the online websites that market vehicles to the consumers and their lead generation software, there is a need for a dealership management system that uses the same development tools as consumer websites, more open to query the records, and browser-based in its design to enable live integration with websites, lead generation software, and other third party tools created to manage a retail dealership's operation. This invention is novel because it uses tools that were intended to create websites (PHP stands for "personal home page") to develop a dealership management system.

The previous generation of web tool would have made this invention almost impossible. The objective of that generation of the Internet was to provide an attractive read-only web site for shoppers. With the recent evolution of the Internet from read-only to Web 2.0, this enables users to not only read but to easily write to applications, thus providing a new opportunity to invent a rich Internet application that replaces the legacy database systems managing dealerships.

SUMMARY

According to one embodiment, a method of using a browser for managing the financial, customer, and inventory data of a retail dealership is provided. The Internet has trained users how to use browser displays of lists to search, sort, or filter data. Without instruction, users can naturally click on each column expecting a sort of account numbers in the general ledger display because it is the same method used when they are shopping on the Internet and want to sort prices from low to high. They can also use advanced filtering to find a range of data. With current legacy systems, sorts and filtering are normally done with report writers or complicated input forms. This visual one-click creates a new and novel way to display dealership management system data.

In another aspect, individual records are displayed in a tabbed format for the ease of adding or editing records. By breaking up the data into manageable tabs, the users can quickly find and edit the data they need. To further make it easier for the users, client-side scripting tools make entering data simple. The user types a few letters of the account number or part number and the application suggests the rest. Drop down selections keep the data consistent. Compared to legacy systems, this is an easy easier user interface and concentrates on the speed of data entry.

In another embodiment, using server side scripts speeds up the query of the data and complicated calculations. A dealership management system has the burden to not only display stored data, but to also process data. This trim, fast, and open scripting language was created to speed up access on the Internet and has been kept fast because typical Internet sites using server side scripting languages handle millions of requests. Although, not thought considered to be a business development tool, this invention recognized the speed of server side scripting as a solution to not only improve database queries, but to perform the numerous calculations required of a dealership management system like deterring monthly payments or creating complicate inventory stock orders.

In yet another embodiment, the architecture design of this system that integrates web application tools into the web form and client side scripting code prevents the need to query the database again and again to provide previews of linked information. This improves the performance of the relational database by minimizing access. Database performance has always been a speed issue for legacy dealership management systems and this invention solves the speed issue with this embodiments.

BRIEF DESCRIPTION OF THE DRAWINGS

FIG. 1a Illustrates features and advantages of using a web-based dealership management system FIG. 1b Illustrates a record add or update form with client and server side scripts FIG. 2 Shows a flowchart of using client and server side embedded scripts on a form to update the database

DETAILED DESCRIPTIONS

Described herein is a method and system for a browser-based dealership management system and more particularly, a method of using web-based tools to provide accounting, financial reporting, sales tracking, and customer management for automotive, truck, RV, motorcycle, and boat retail dealerships.

FIG. 1 shows the basic features of using a web-based system for managing the financial, customer, and inventory data of a retail dealership. As shown in FIG. 1, using a browser enables a sort by each column 110, Search 120, or filtering with an advanced search 130 with multiple criteria 160. The invention also provides for exporting the data in various formats. When a user moves their mouse over the record and a preview of the linked data is displayed 150. If a user clicks on the record again, the data is presenting in tabbed multi-page views 170 providing a way for the users to jump back and forth between tabs to enter or edit the data as desired. The user selects fields that use a lookup table and "Auto Suggest" 180 to keep the data entry consistent while entering or editing data.

In the example in FIG. 1, the general ledger is displayed in a browser. This same display is used for the inventories (vehicle and parts,) employees, sales, customers, or other various tables. A sort 110 of the display can be completed by clicking on the column heading once for ascending and again for descending. By using a specific search 120, a user can enter a portion of the account number, account name, or any other specific field based on the design of the table and all matching items are displayed. If the customers were being displayed, then the user might enter a the first few letters of the last name. Compared to a typical web-browser search that finds all the records on the page with that data, this specific search limits the search to only the fields designed by the invention specific to the industry. A custom search panel 160 can be used to search multiple fields, and if the user wants to enter multiple criteria in a search for example; all accounts with an amount between $10,000 and $20,000 dollars for a range of dates between Jan. 1, 2007 and Jan. 14, 2007, then the novel method of an advanced search can be used 130 using conditions designed specifically for the industry. The search form submits a request to the web based relational database server using a server side script and the results are displayed 110 and then can be sorted, printed or downloaded to various file formats 140. In order to reduce accessing the web based relational database server, a user can move their mouse over the record and a preview of the linked data is displayed using client side scripts 150. The preview shows the same data in the linked file, but in a window that totals the records. This window is not the dreaded blocked "pop-up" window, rather a hovering preview overlay window 150 within the application. When a record is not found, then the user can enter a new record using a tabbed multi-page format 170 or edit the record that was found. When a field on the tab is a selection field 180, then the application does an "Auto suggest" with a lookup table designed specific to the industry to keep the data entry consistent while entering or editing data.

FIG. 2 is a flow chart of the typical processing of data using server side scripts for calculations. These steps include the user entering data 210 and then selecting data from setup tables 220 or related source tables 230. The server side script creates calculated fields 240. The calculated fields and stored fields create transactions are then posted 250, which decrease or increase balances 270 and then the related source tables are updated 260.

TABLE 1

Server side script example that creates the amount financed field //Get
variables like the price the customer is paying, their down payment and the amount given
for their trade-in 210 <?php function ds_amtfincalc( ) { $Price = $_SESSION["Price"];
$Discount = $_SESSION["Discount"]; $TradeNet = $_SESSION["TradeNet"];
$DownPayment = $_SESSION["DownPayment"]; $TotalAdds =
$_SESSION["TotalAddsPrice"]; $RebateTotalNonTax =
$_SESSION["TotalRebatesNonTaxable"]; $RebateTotalTax =
$_SESSION["TotalRebatesTaxable"]; $TotalFees = $_SESSION["TotalFees"];
$TotalLifeAHPremiumTaxable = $_SESSION["TotalLifeAHPremiumTaxable"];
$TotalLifeAHPremiumNonTaxable =
$_SESSION["TotalLifeAHPremiumNonTaxable"]; $TotalServiceContractsPriceTaxable
= $_SESSION["TotalServiceContractsPriceTaxable"];
$TotalServiceContractsPriceNonTaxable =
$_SESSION["TotalServiceContractsPriceNonTaxable"]; // Determine the Amount
Financed Amount by taking the price, subtracting their trade-in and down payment,
charging sales tax and adding any products purchased 240 $amttax = $Price − $Discount −
$TradeNet − $DownPayment + $TotalServiceContractsPriceTaxable +
$TotalLifeAHPremiumTaxable + $TotalAdds + $TotalFees − $RebateTotalNonTax;
$taxrate = ds_taxratedeals( ); $SalesTax = $amttax * $taxrate; $amt = $amttax −
$RebateTotalTax + $SalesTax +$TotalLifeAHPremiumNonTaxable +
$TotalServiceContractsPriceNonTaxable; $_SESSION["AmtFinancePrice"] = $amt;
$_SESSION["SalesTax"] = $SalesTax; return $amt; } ?>

The user selects a bank 220 and in that setup table are the specifications for the interest calculated method used by that bank. Each bank can use a different method to calculate interest (finance charges.) Then the server side script calculates the monthly payment based this setup for each bank.

TABLE 2

Server side script example that creates the monthly payment amount field
// Amounts entered by the user 210 function ds_paymentcalc( ) { $amt = $_SESSION["AmtFinancePrice"]; $Rate = $_SESSION["Rate"]; $Days = $_SESSION["DaysToFirstPayment"]; $Term =

TABLE 2-continued $_SESSION["Term"]; $Term = $Term *-1; $pos = strlen($Rate); $pos2 = strlen($Term); // Calculations of simple interest formula used by selected bank 220 if ($Rate >1) { $Rate = $Rate/100; } if ($pos <1) { $pay = $amt; return $pay; } elseif ($Rate == 0) { $pay = $amt; return $pay; } elseif ($pos2 <1) { $pay = $amt; return $pay; } elseif ($Term==0) { $pay = $amt; return $pay; } else { $pos1 = (1+$Rate/12); $pay = ($amt*($Rate/12))/((1− pow($pos1, $Term))); return $pay; }

In this example, when the sale is complete, the deal is posted with a server side script to the General Ledger 250 and the balance of an account, increases or decreases.

TABLE 3

Server side script (dealpost) that posts the vehicle sale deal and updates tables
// This takes the user data 210 and vehicle selected data 230 along with amounts calculated 240 and posts to the general ledger 250 function dealpost ($conn) { if ($_SESSION['countok']==0){ $today = date(c); $hdrsql = "SELECT * FROM deals WHERE (DealID='$_SESSION[DealID]' AND QuoteID = '$_SESSION[QuoteID]' AND StoreID = '$_SESSION[StoreID]')"; $resulthdr = mysql_query($hdrsql); while ($row = mysql_fetch_assoc($resulthdr)) { $StoreID = $row["StoreID"]; $Journal = "CarDeals"; $RefDesc = $row["BuyerFirstName"]; $RefDesc .= " "; $RefDesc .= $row["BuyerMidName"]; $RefDesc .= " "; $RefDesc .= $row["BuyerLastName"]; $custname = $RefDesc; $adate = $today; $slp = $row["Sales1Name"]; $AccountNumber = $row["SaleAccount"]; $SaleAccount = $row["SaleAccount"]; $custid = $row["CustID"]; $fimgr = $row["FIMgrName"]; $linessql = "SELECT * FROM glaccountsetup WHERE (AccountNumber='$AccountNumber' AND StoreID = '$_SESSION[StoreID]')"; $resultname = mysql_query($linessql); while ($row = mysql_fetch_assoc($resultname)) { $AccountName = mysql_real_escape_string($row["AccountName"]); $groupid = $row["GroupID"]; $typecode = $row["TypeCode"]; $chaindebit = $row["ChainDebit"]; $chaincredit = $row["ChainCredit"]; } $CreatedBy = CurrentUserName( ); $PostingDate = $today; $LastChangedBy = CurrentUserName( ); $LastChangedDate =ew_CurrentDate( ); $LastChangedTime=ew_CurrentTime( ); $LastChangedTerminal=ew_CurrentUserIP( );
// Get calculated information 240 $hdrsqldq = "SELECT * FROM dealsquote WHERE (DealID='$_SESSION[DealID]' AND QuoteID = '$_SESSION[QuoteID]' AND StoreID = '$_SESSION[StoreID]')"; $resultdq = mysql_query($hdrsqldq); while ($row = mysql_fetch_assoc($resultdq)) { $Amount = $row["Price"]; $StockNum = $row["StockNum"]; $Reference = $row["DealID"]; $ControlNumber = $row["StockNum"]; $ControlName = $RefDesc; $ControlAlternate = $row["VIN"]; $VIN = $row["VIN"]; $last8 = substr($VIN,−8); $PostingDescription = $slp; $bank = $row["Bank"]; $newused = $row["NUD"]; $SalesTax = $row["SalesTax"]; } // Get bank information 220 $hdrsqlbk = "SELECT * FROM dealsquotebanknameselect WHERE (Name='$bank' AND StoreID = '$_SESSION[StoreID]')"; $resultbk = mysql_query($hdrsqlbk); while ($row = mysql_fetch_assoc($resultbk)) { $AmtDueAccountNumber = $row["AmtDueAccountNumber"]; $ReserveReceivableAccount = $row["ReserveReceivableAccount"]; $ReserveIncomeAccountNew = $row["ReserveIncomeAccountNew"]; $ReserveIncomeAccountUsed = $row["ReserveIncomeAccountUsed"]; } // Create posting header 250 mysql_query("insert into gljvhdr (StoreID, Reference, Journal, ReferenceDescription, AccountingDate, CreatedBy, LastChangedBy, LastChangedDate, LastChangedTime, LastChangedTerminal) values ('$_SESSION[StoreID]', '$Reference', '$Journal', '$RefDesc', '$adate', '$CreatedBy', '$LastChangedBy ', '$LastChangedDate', '$LastChangedTime', '$LastChangedTerminal')") or die(mysql_error( )); $voucherid = mysql_insert_id( ); $_SESSION['voucherid']=$voucherid; } //Note: The script lines for posting of doc fees, rebates, aftermarket, commissions, we owes were removed from script to reduce example's length 250 } mysql_query("insert into gljvlines (StoreID, VoucherID, AccountNumber, AccountName, Amount, ControlNumber, ControlName, ControlAlternate, PostingDescription, CreatedBy, LastChangedBy, LastChangedDate, LastChangedTime, LastChangedTerminal) values ('$_SESSION[StoreID]', '$voucherid', '$AccountNumber', '$AccountName', '$Amount', '$ControlNumber', '$ControlName', '$ControlAlternate', '$PostingDescription', '$CreatedBy', '$LastChangedBy ', '$LastChangedDate', '$LastChangedTime', '$LastChangedTerminal')") or die(mysql_error( )); if ($SalesTax >0){ $Amount = $SalesTax * (−1); $AccountNumber = $SalesTaxAccount; $linessql = "SELECT * FROM glaccountsetup WHERE (AccountNumber='$AccountNumber' AND StoreID = '$_SESSION[StoreID]')"; $resultname = mysql_query($linessql); while ($row = mysql_fetch_assoc($resultname)) { $AccountName = mysql_real_escape_string($row["AccountName"]); $groupid = $row["GroupID"]; $typecode = $row["TypeCode"]; } mysql_query("insert into gljvlines (StoreID, VoucherID, AccountNumber, AccountName, Amount, ControlNumber, ControlName, ControlAlternate, PostingDescription, CreatedBy, LastChangedBy, LastChangedDate, LastChangedTime, LastChangedTerminal) values ('$_SESSION[StoreID]', '$voucherid', '$AccountNumber', '$AccountName', '$Amount', '$ControlNumber', '$ControlName', '$ControlAlternate', '$PostingDescription', '$CreatedBy', '$LastChangedBy ', '$LastChangedDate', '$LastChangedTime', '$LastChangedTerminal')") or die(mysql_error( )); } // Create posting JV 250 $Amount

TABLE 3-continued

= $Amount * (−1); $ControlName = $custname; $ControlAlternate = $VIN; $PostingDescription = $Description; mysql_query("insert into gljvlines (StoreID, VoucherID, AccountNumber, AccountName, Amount, ControlNumber, ControlName, ControlAlternate, PostingDescription, CreatedBy, LastChangedBy, LastChangedDate, LastChangedTime, LastChangedTerminal) values ('$_SESSION[StoreID]', '$voucherid', '$AccountNumber', '$AccountName', '$Amount', '$ControlNumber', '$ControlName', '$ControlAlternate', '$PostingDescription', '$CreatedBy', '$LastChangedBy ', '$LastChangedDate', '$LastChangedTime', '$LastChangedTerminal')") or die(mysql_error( )); // Chain Credit and Chain Debit removed from example 250 } $_SESSION[cardposted] = 1; echo "<div align=\"left\" style=\"color:#FFFFFF;background- color:#f8981D; // Notice to the user that posting was completed 270 font-weight:bold\">Car Deal Voucher #$_SESSION[voucherid] created successfully.</div><br />"; header( 'Location: dealsselectedquoterecapvlist.php?' ) ; }
?>

After the deal is posted, the customer's trade-in is inserted into the vehicle inventory table 260 using the data collected during the data entry process 210 and the purchased vehicle status is set to sold.

Example of Server Side Script to Change Status to Sold

TABLE-US-00004

//This updates the vehicle inventory table 260 $status = "Sold"; $result = mysql_query("UPDATE vehicleinventory SET Status ='$status' WHERE (VIN='$VIN' AND StockNumber = '$StockNum' AND StoreID = '$_SESSION[StoreID]')");

Example of Server Side Script to Add Customer's Trade-In to the Inventory Table

TABLE-US-00005

// This add the customer's trade-in 260 to the vehicle table
function updatetrade($conn) { // Get deal date 310 $hdrsql = "SELECT * FROM deals WHERE (DealID='$_SESSION[DealID]' AND QuoteID = '$_SESSION[QuoteID]' AND StoreID = '$_SESSION[StoreID]')"; $resulthdr = mysql_query($hdrsql); while ($row = mysql_fetch_assoc($resulthdr)) { $DateReceived = $row["DealDate"]; } $Type = "InStock"; $status = "InActive"; $CreatedBy = CurrentUserName( ); $LastChangedBy = CurrentUserName( ); $LastChangedDate =ew_CurrentDate( ); $LastChangedTime=ew_CurrentTime( ); $LastChangedTerminal=ew_CurrentUserIP( ); // Get trade-in Information for 260 $trsql = "SELECT * FROM dealsquotetrades WHERE (DealID='$_SESSION[DealID]' AND QuoteID = '$_SESSION[QuoteID]' AND StoreID = '$_SESSION[StoreID]')"; $resulttr = mysql_query($trsql); while ($rowtr = mysql_fetch_assoc($resulttr)) { $custid = $rowtr["StoreID"]; $VIN = $rowtr["VIN"]; $StockNum = $rowtr["StockNumber"]; $VIN = $rowtr["VIN"]; $LicenseNumber = $rowtr["LicenseNumber"]; $Year = $rowtr["Year"]; $Make = $rowtr["Make"]; $Model = $rowtr["Model"]; $Color = $rowtr["Color"]; $Odometer = $rowtr["Odometer"]; $VehicleDescription .= $Year; $VehicleDescription .= " "; $VehicleDescription .= $Make; $VehicleDescription .= " "; $VehicleDescription .= $Model; $Trim = $rowtr["Trim"]; $FuelType = $rowtr["FuelType"]; $transa = $rowtr["Automatic"]; $transm= $rowtr["Manual"]; $PS = $rowtr["PowerSteering"]; $Air = $rowtr["Air"]; $Body = $rowtr["Body"]; $Cylinder = $rowtr["Cylinder"]; $Radio = $rowtr["Radio"]; $CarTruck = $rowtr["CarTruck"]; $PowerBrakes = $rowtr["PowerBrakes"]; $PowerWindows = $rowtr["PowerWindows"]; $Tilt = $rowtr["Tilt"]; $ABS = $rowtr["ABS"]; $DaytimeLights = $rowtr["DaytimeLights"]; $Roof = $rowtr["Roof"]; } if ($transa == "Y") { $Trans = "A"; } elseif ($transm == "Y") { $Trans = "M"; } // Check for existing customer vehicle record and inventory removed from example else { mysql_query("UPDATE vehicleinventory SET StoreID = '$_SESSION[StoreID]', Status = '$status', DateReceived = '$DateReceived', Power Windows ='$Power Windows', PowerBrakes = '$PowerBrakes', PowerSteering = '$PS', Tilt = '$Tilt', ABS = '$ABS', Air = '$Air', DaytimeLights = '$DaytimeLights', Roof = '$Roof', CarTruck = '$CarTruck', Body = '$Body', LastChangedBy = '$LastChangedBy', LastChangedDate = "$LastChangedDate', LastChangedTime = '$LastChangedTime', LastChangedTerminal = '$LastChangedTerminal' WHERE VIN = '$VIN'") or die(mysql_error( )); } $_SESSION[tradeupdated] = 1; header( 'Location: dealsselectedquoterecapvlist.php?' ) ; } ?>

FIG. 3 is an overview of the technical layer architecture of the invention. The first layer is the web browser 310 that makes a request with a form and server side script to the next layer; a web server 320 with server side scripting language installed. The web server processes the script 330 and queries the third layer; a web server relational database 340. The results 350 are formatted using web application tools into dynamic web pages sent back to the web browser 360.

The web browser 310 has an advantage of being able to use most any browser. This browser can have specific features like a spell checker or changing the text size. The web server 320 can be any format as long as it has a scripting language installed. The server side scripts 330 process calculations and send queries to the database. The current web server relational database products 340 have the new features of views that can be updated similar to tables, but users, based on their security to see different versions of the same table data. The dynamic pages of the results 350 from the database are created in web pages that depend on customized CSS (stylesheets) to present the data in an attractive and user friendly format 360. Embedded in these web pages 360 are client side scripts that reduce the need to re-query the data presenting a preview of a link file.

The invention claimed is:

1. A method for using server and client side scripts in a dealer management system to process and manage financial, customer, and inventory data which comprises:

a. calculating a monthly finance payment for a customer using one or more server side scripts to obtain a default selling price from a integrated vehicle inventory table in a database customized for the automotive, truck, RV, motorcycle or boat industry, a down payment from an integrated accounting receipts table, options and reconditioning costs from an integrated repair order and options tables, and a trade in value from an integrated lead database and using one or more embedded client side scripts in a web page to obtain terms and a bank name from a user of the dealership management system and use the one or more server side scripts to obtain from bank setup tables a calculation method based on the bank name to perform the payment calculations;

b. determining an extended sale amount of parts after the user of the dealership management system selects the customer filtered by the one or more client side scripts and part number filtered by manufacturer and then using the one or more server side scripts to obtain a pricing code from an integrated customer table, and cost, pricing, and source fields from an integrated parts inventory table based on the manufacturer, a price markup or discount percentages from a pricing matrix table that includes price escalations based on price ranges and the manufacturer (source) of the parts, and using the one or more client side scripts to perform the calculations after obtaining a quantity from the user of the dealership management system;

c. determining an extended sale amounts of labor after the user of the dealership management system selects the customer, customer's vehicle to be repaired, and type of repairs being performed from integrated customer, vehicles, and labor type tables filtered by the one or more client side scripts, and then using the one or more server side scripts to obtain a pricing code from the integrated customer table, a labor rate based on the type of repairs being performed from a labor rate table, hours from an integrated labor operations table obtained from the manufacturer or other provider and based on the type of vehicle being repaired, and a markup or discount of that rate based on an amount of hours in a labor grid table and then performing extended sale amount calculations using the one or more client side scripts;

d. calculating a sales tax on parts and service sales by using the one or more server side scripts to determine if an item or customer type is taxable based on integrated setup tables, customer tables, and item tables and using the one or more client side scripts to enable the user of the dealership management system to override the one or more client side scripts results and make the customer exempt;

e. calculating a sales tax due on vehicle sales using the one or more client side calculations after using the one or more server side scripts to obtain a correct tax rate based on an address for the customer from the integrated customer table in a tax rate table, the sales type of the items selected by the user of the dealership management system and subtracting any deductions allowed by each state per the tax rate table and using the one or more client side scripts to enable the user of the dealership management system to override the one or more client side scripts results and make the customer exempt or select another taxing authority shown by the one or more client side scripts;

f. determining a balance due on repair orders and parts tickets using the one or more client side scripts to perform calculations totaling the extended sale amounts, other charges, and sales tax and then using the one or more server side scripts to obtain any payments made from an integrated customer payment table and if the customer can charge from the integrated customer table;

g. posting the repair order and parts ticket transactions to a general ledger using the one or more server side scripts to obtain the general ledger account numbers for the transactions based on setup tables in the database customized for the automotive, truck, RV, motorcycle or boat industry and using the one or more client side scripts to select the correct general ledger account number based on the sales and customer type of the repair order and parts ticket;

h. posting deposits and receipts transactions to the general ledger using the one or more server side scripts and updating the integrated vehicle sale deals, parts tickets, and repair orders tables with down payments, parts deposits and other payments received for a related customer record;

i. posting purchases of parts to the general ledger using the one or more server side scripts and updating the integrated parts inventory table with a last purchase date and adjusting the parts inventory on hand balance;

j. posting purchases of vehicles to the general ledger using the one or more server side scripts and updating the integrated vehicle inventory table with cost, invoice, holdback, advertising, and vendor information;

k. posting vehicle sale to the general ledger using the one or more server side scripts to obtain the general ledger account numbers for the transactions based on setup tables in the database customized for the automotive, truck, RV, motorcycle or boat industry and using the one or more client side scripts to select the correct general ledger account number based on the sales and customer type of the deal;

l. calculating payroll wages for technicians using integrated flag hours uploaded from the repair orders using the one or more client side scripts then updating the repair order to prevent changes to paid hours after the payroll has been paid to the technician;

m. calculating payroll wages for sales people using integrated commissions payable records from a vehicle sale deal commission schedules linked to an employee's pay using the one or more client side scripts;
n. calculating deductions and net pay using integrated employee receivable with amounts due from the employee's purchases of parts, repair orders, vehicles, spiffs, or draws linked to the employee's pay using the one or more client side scripts;
o. performing month end processing of scheduled general ledger accounts using the one or more server side scripts that clear a detail display using the one or more client side scripts to obtain from the user of the dealership management system a range of dates and type of clearing process to use;
p. performing month end processing of unscheduled account using the one or more server sides scripts to clear a detail using the one or more client side scripts to obtain from the user of the dealership management system the records to clear;
q. performing month end processing of vendor accounts by using the one or more client side scripts to display a last check date, an average check amount, and a detail to alert the user of the dealership management system to any vendor amounts that need to be accrued;
r. performing year end compressing, backup, and cleansing of parts ticket, repair order, and vehicle sales transaction tables of the database customized for the automotive, truck, RV, motorcycle or boat industry using the one or more server side scripts and database optimization tools; and
s. performing year end maintenance of general ledger accounts with the one or more server side scripts.

* * * * *